United States Patent Office 3,288,889
Patented Nov. 29, 1966

3,288,889
ORGANOPHOSPHORUS COMPOUNDS CONTAINING FULLY HALOGENATED ISOPROPENYL GROUPS
Karoly Szabo, Pleasantville, N.Y., assignor to Stauffer Chemical Company, New York, N.Y., a corporation of Delaware
No Drawing. Filed Jan. 15, 1963, Ser. No. 251,474
3 Claims. (Cl. 260—955)

This invention relates to organophosphorus compounds and in particular to organophosphorus esters wherein one of the esterifying moieties is an isopropenyl radical which is completely halogenated with fluorine and chlorine. The invention is also concerned with a method of preparing the aforesaid compounds.

The new and novel organophosphorus esters as contemplated herein can be depicted by the following general formula:

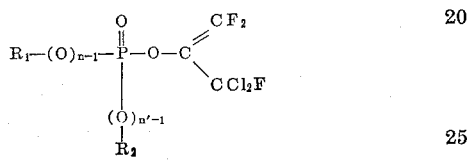

wherein $R_1$ and $R_2$, which may be alike or different, each represents a hydrocarbon radical having from 1 to 20 carbon atoms as exemplified by an aliphatic hydrocarbon radical such as an alkyl group, e.g., methyl, ethyl, 2-chloroethyl, 2-methoxyethyl, n-propyl, isobutyl, tert.-butyl, n-amyl, isohexyl, n-heptyl, isooctyl, n-decyl, tridecyl, tetradecyl, pentadecyl, octadecyl, etc., an alkenyl group e.g., allyl, methallyl, 3-butenyl, 3-pentenyl, 4-hexenyl, etc., a cycloaliphatic group, e.g., cyclopentyl, cyclohexyl, 4-methylcyclohexyl, etc., an aralkyl group, e.g., benzyl, phenethyl, γ-phenylpropyl, naphthylmethyl, etc., an aromatic hydrocarbon group of the benzene and naphthalene series, e.g., phenyl, halophenyl such as p-chlorophenyl, o-chlorophenyl, 2,4-dichlorophenyl, p-bromophenyl and the like, p-tolyl, o-tolyl, p-methoxyphenyl, p-diethylaminophenyl, etc., 1-naphthyl, 4-chloro-1-naphthyl, 4-methoxy-2-naphthyl, etc., or an amino radical, e.g., —$NR_3R_4$ where $R_3$ and $R_4$ stand for H or lower alkyl, and $n$ and $n'$ are integers of from 1 to 2, it being understood that $n$ or $n'$ is always 1 when correlative $R_1$ or $R_2$ represents an amino radical.

Exemplary configurations falling within the metes and bounds of the general formula include the following:

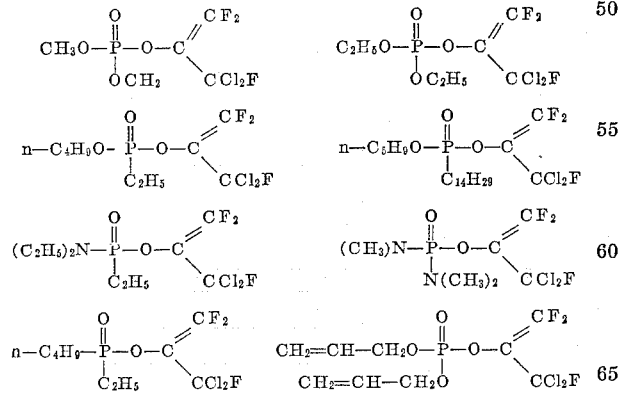

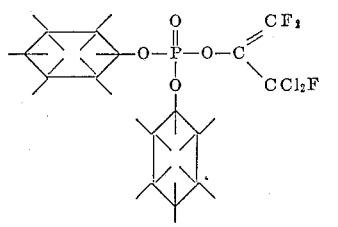

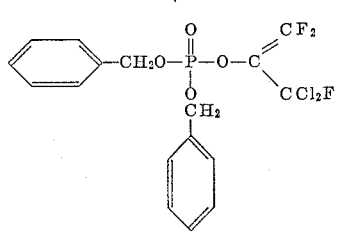

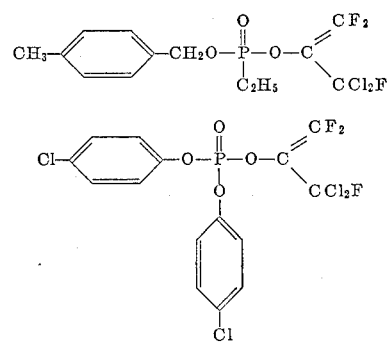

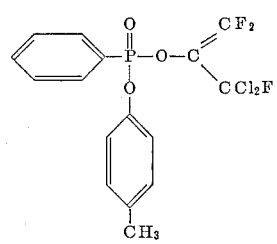

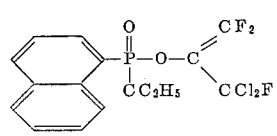

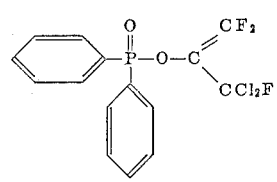

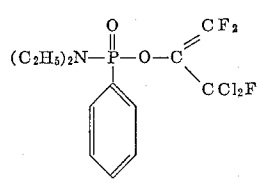

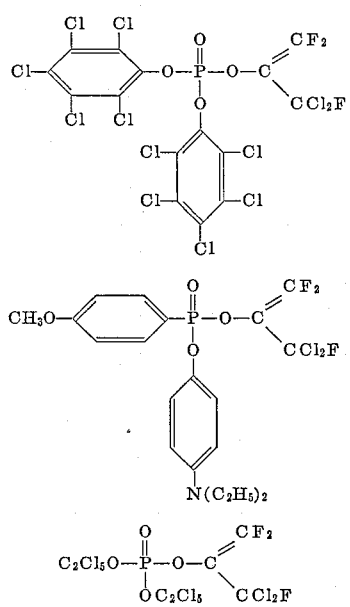

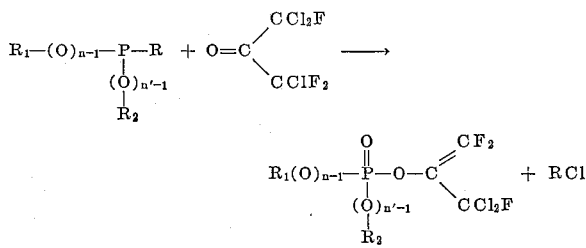

The organophosphorus esters of the invention can be realized by condensing a tertiary phosphorus derivative having attached to the phosphorus atom thereof at least one lower aliphatic ether group or a hydroxy group with 1,3,3-trichloro-1,1,3-trifluoroacetone. The reaction usually takes place spontaneously when the reactants are brought into contact and is moreover accompanied by the evolution of heat. In the case of the more energetic condensations, external cooling of the reaction vessel is recommended. As can be seen from an examination of the chemical equation depicted below, one molecule of the halogenated acetone reacts with one molecule of the tertiary organophosphorus component, thereby yielding one mole of the halogenated isopropenyl ester, while at the same time forming as a by-product either an alkyl chloride or hydrogen chloride.

$$R_1-(O)_{n-1}-\underset{\underset{R_2}{(O)_{n'-1}}}{P}-R + O=C\begin{matrix}CCl_2F\\ \\CClF_2\end{matrix} \longrightarrow$$

$$R_1(O)_{n-1}-\underset{\underset{R_2}{(O)_{n'-1}}}{\overset{\overset{O}{\|}}{P}}-O-C\begin{matrix}CF_2\\ \\CCl_2F\end{matrix} + RCl$$

wherein R represents lower alkoxy or hydroxy and $R_1$, $R_2$, and $n$ and $n'$ have the significance as previously set forth.

In general, it has been found that the lower alkoxy esters of phosphorus acids react with the greatest ease and vigor followed next in reactivity by the tertiary phosphorus components having a hydroxy group while a phenoxy group has proved to be the least reactive function and in fact has exhibited no tendency to undergo cleavage in the presence of the trichlorotrifluoroacetone.

In preparing the organophosphorus esters of the invention, it has been ascertained that generally excellent results ensue by condensing a lower alkyl ester of a tertiary phosphorus acid with the fully halogenated acetone. The reaction is conveniently carried out in the presence of an organic solvent with a slight excess of the phosphorus ester. In the majority of cases, heat is evolved and external cooling is commonly required. The organic solvents are preferably of the relatively inert type, normally liquid at room temperature and in this connection the aromatic hydrocarbons have proven especially serviceable. Other convenient solvents are the saturated aliphatic and cyclic hydrocarbons including their liquid chlorinated derivatives, the lower alcohols, ketones, Cellosolves, ethers and the like. In some instances, an excess of one of the reactants serves as a satisfactory solvent.

The 1,3,3-trichloro-1,1,3-trifluoroacetone and tertiary phosphorus acid derivatives used as intermediates in synthesizing the organophosphorus compounds of the present invention are known substances, the description and preparation of which can be found in the chemical literature. For instance, the preparation of fully halogenated acetones, including the aforementioned reactant, is given in U.S. Patent 2,853,524. With respect to the tertiary organophosphorus reactants, these are likewise described in various chemical publications and treatises. The well-known text on "Organophosphorus Compounds" by Kosolapoff is especially useful in obtaining directions for the sources and prepartion of various phosphorus acids and their derivatives. As used herein, the term "tertiary organophosphorus acid derivatives" includes the various esters of phosphorus, phosphonus and phosphinus acids as well as the substituted derivatives of these acids, i.e. the various hydrocarbon substituted acids as exemplified by alkyl and aryl phosphorus acids.

The organophosphorus compounds as contemplated herein are characterized by a number of useful and valuable properties and have proven especially efficacious as toxicants for use in destroying a variety of pest organisms falling within the lower order of biological classification. For instance, the compound of Example 1 has been found to be an excellent fungicide and gave 100% control of mildew on beans, the concentration of toxicant being 50 p.p.m. It is to be noted that the fungicide activity was of the systemic type and this is a further and important advantage of such compounds. Because of their high halogen content, the organophosphorus esters of the invention find extensive application as flame-proofing agents. The double bond of the fully halogenated isopropenyl ester group can be readily transformed into other new and useful configurations and in this connection reference is made to such reactions as hydrogenation, hydrohalogenation and halogenation. Those skilled in the art will recognize that other chemical transformations can be carried out utilizing the chemical activity of the double bond in the isopropenyl radical.

Reference is now made to the following examples which are inserted for the purpose of illustrating the various processes and products described herein. However, such examples are for the purpose of illustration only and those skilled in the art will appreciate that various modifications of the invention can be practiced without departing from the scope or spirit thereof.

*Example 1.—3,3-dichloro-1,1,3-trifluoroisopropenyl diethyl phosphate*

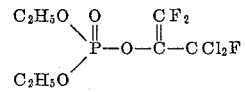

21.5 g. (0.1 M) of trichlorotrifluoroacetone and 70 ml. of benzene were placed in a multi-necked flask equipped with a stirrer, dropping funnel, thermometer and reflux condenser. The system was then placed under a nitrogen atmosphere, after which 38.0 g. (0.23 M) of triethylphosphite was added dropwise while maintaining thorough agitation. The introduction of the phosphorus ester produced a vigorous exothermic reaction necessitating cooling of the outside of the reaction vessel. The temperature was not allowed to exceed 50° C. during the addition. After about half of the triethylphosphite had been introduced, the vigor of the reaction subsided and it generally becomes necessary to apply external heat to complete the reaction. After refluxing for 3 hours, the evolution of ethyl chloride has ceased completely and the contents of the flask allowed to cool after which they were subjected to fractional distillation. The main product was a colorless oil amounting to 19.0 g., having a boiling point at 2.5 mm. of 96–98° C. and an $N_D^{25}$ of 1.4153.

Analysis of the purified material was in consonance with the above depicted structural formula.

*Example 2.—3,3 - dichloro - 1,1,3-trifluoroisopropenyl dimethyl phosphate*

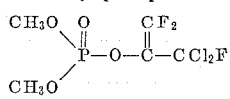

The procedure of Example 1 was again carried out but using a proportional amount of trimethylphosphite in lieu of the triethyl ester of the first example. In general, the results and yields paralleled those as originally obtained. The product in this example boiled at 72–73° C. at 1.5 mm. and its refractive index was 1.4120. Analytical data was in conformity with the structure as above given.

*Example 3.—Diallyl 3,3-dichloro-1,1,3-trifluoroisopropenyl phosphate*

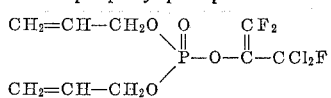

Utilizing the procedure as above described, a slight molar excess of triallylphosphite was reacted with trichlorotrifluoroacetone. The product was isolated from the reaction mixture by distillation in vacuo. The purified material was a colorless oil.

*Example 4.—3,3-dichloro-1,1,3-trifluoroisopropenyl diphenylphosphinate*

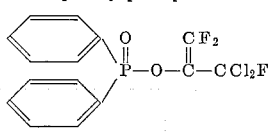

In this example, the organophosphorus component was the ethyl ester of diphenylphosphinous acid. In general, however, the reaction was effected in the same manner as above described for the previous examples.

*Example 5.—3,3-dichloro-1,1,3-trifluoroisopropenyl diethylphosphinate*

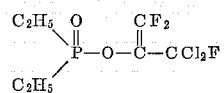

This example was carried out in a like manner to the previous examples excepting the organophosphorus compound was methyl diethyl phosphinite.

*Example 6.—3,3-dichloro-1,1,3-trifluoroisopropenyl methyl N,N-diethylphosphonoamidate*

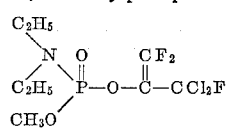

This example was carried out in a like manner to the previous examples excepting the organophosphorus starting material was dimethyl N,N-diethylphosphonoamidite. The product distills between 75 to 78° C. at 0.7 mm. and has a refractive index of 1.4045 at 24° C. The chemical analysis was in agreement with the above depicted structure.

Using the same procedure as previously given, the following examples were prepared:

*Example 7*

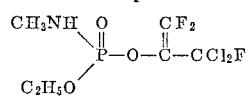

*Example 8*

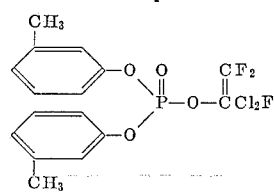

*Example 9*

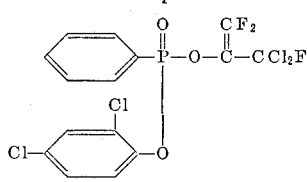

I claim:
1. An organophosphorus compound of the formula:

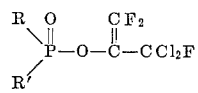

wherein R is selected from the group consisting of lower alkoxy of from 1 to 8 carbon atoms, lower alkylamino having from 1 to 18 carbon atoms, and allyloxy; R' is selected from the group consisting of allyloxy and lower alkyl amino having from 1 to 18 carbon atoms.

2. The organophosphorus compound of the formula:

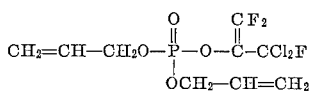

3. The organophosphorus compound of the formula:

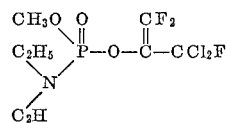

References Cited by the Examiner
UNITED STATES PATENTS

| 3,027,296 | 3/1962 | Whetstone et al. | 260—461.312 |
| 3,149,142 | 9/1964 | Drysdale | 260—461 |
| 3,170,944 | 2/1965 | Szabo | 260—461 |

FOREIGN PATENTS

| 1,066,923 | 1/1954 | France. | |

OTHER REFERENCES

Allen et al.: "J. Am. Chem. Soc.," vol. 77, pages 2871–2875 (1955).

CHARLES, B. PARKER, *Primary Examiner.*

IRVING MARCUS, *Examiner.*

F. M. SIKORA, D. R. PHILLIPS, R. L. RAYMOND,
*Assistant Examiners.*

UNITED STATES PATENT OFFICE
CERTIFICATE OF CORRECTION

Patent No. 3,288,889                 November 29, 1966

Karoly Szabo

It is hereby certified that error appears in the above numbered patent requiring correction and that the said Letters Patent should read as corrected below.

Column 1, lines 59 to 65, for the left-hand portion of the formula reading $(CH_3)N-$        read        $(CH_3)_2N-$ column 2, lines 45 to 50, for the middle portion of the formula reading $|\!\!\operatorname{CC_2H_5}$        read        $|\!\!\operatorname{OC_2H_5}$ column 6, lines 44 to 49, for the left-hand bottom portion of the formula reading $/C_2H$        read        $/C_2H_5$ Signed and sealed this 19th day of September 1967.

(SEAL)
Attest:

ERNEST W. SWIDER
Attesting Officer

EDWARD J. BRENNER
Commissioner of Patents